United States Patent
Kim et al.

(10) Patent No.: US 6,950,473 B2
(45) Date of Patent: Sep. 27, 2005

(54) HYBRID TECHNIQUE FOR REDUCING BLOCKING AND RINGING ARTIFACTS IN LOW-BIT-RATE CODING

(75) Inventors: Changick Kim, Cupertino, CA (US); William Chen, Foster City, CA (US); Vasudev Bhaskaran, Mountain View, CA (US)

(73) Assignee: Seiko Epson Corporation, Tokyo (JP)

(*) Notice: Subject to any disclaimer, the term of this patent is extended or adjusted under 35 U.S.C. 154(b) by 635 days.

(21) Appl. No.: 10/176,994

(22) Filed: Jun. 21, 2002

(65) Prior Publication Data

US 2003/0235248 A1 Dec. 25, 2003

(51) Int. Cl.$^7$ ................................................. H04N 7/12
(52) U.S. Cl. ................................................. 375/240.29
(58) Field of Search ....................... 375/240.24, 240.29; 348/420.1, 607, 627, 701; 382/268, 252, 275

(56) References Cited

U.S. PATENT DOCUMENTS

| | | | |
|---|---|---|---|
| 5,454,051 A | | 9/1995 | Smith |
| 5,563,718 A | * | 10/1996 | Wober et al. ............... 382/250 |
| 5,832,135 A | * | 11/1998 | Merhav et al. ............. 382/260 |
| 5,883,983 A | | 3/1999 | Lee et al. |
| 5,937,101 A | | 8/1999 | Jeon et al. |
| 5,974,197 A | | 10/1999 | Lee et al. |
| 6,028,967 A | | 2/2000 | Kim et al. |
| 6,115,503 A | | 9/2000 | Kaup |
| 6,151,420 A | | 11/2000 | Wober et al. |

(Continued)

FOREIGN PATENT DOCUMENTS

| WO | WO 00/33254 | 6/2000 |
|---|---|---|

OTHER PUBLICATIONS

Blocking artefact removal based on frequency analysis Jiwu Huang; Shi, Y.Q.; Xianhua Dai; Electronics Letters, vol. 34, Issue 24, Nov. 26, 1998 Page(s):2323–2325.*

(Continued)

*Primary Examiner*—Vu Le
(74) *Attorney, Agent, or Firm*—Michael T. Gabrik

(57) ABSTRACT

A power-scalable hybrid technique to reduce blocking and ringing artifacts in low bit-rate block-based video coding is employed in connection with a modified decoder structure. Fast inverse motion compensation is applied directly in the compressed domain, so that the transform (e.g., DCT) coefficients of the current frame can be reconstructed from those of the previous frame. The spatial characteristics of each block is calculated from the DCT coefficients, and each block is classified as either low-activity or high-activity. For each low-activity block, its DC coefficient value and the DC coefficient values of the surrounding eight neighbor blocks are exploited to predict low frequency AC coefficients which reflect the original coefficients before quantization in the encoding stage. The predicted AC coefficients are inserted into the low activity blocks where blocking artifacts are most noticeable. Subject to available resources, this may be followed by spatial domain post-processing, in which two kinds of low-pass filters are adaptively applied, on a block-by-block basis, according to the classification of the particular block. Strong low-pass filtering is applied in low-activity blocks where the blocking artifacts are most noticeable, whereas weak low-pass filtering is applied in high-activity blocks where ringing noise as well as blocking artifacts may exist. In low activity blocks, the blocking artifacts are reduced by one dimensional horizontal and vertical low-pass filters which are selectively applied in either the horizontal and/or vertical direction depending on the locations and absolute values of the predicted AC coefficients. In high activity blocks, de-blocking and de-ringing is conducted by 2- or 3-tap filters, applied horizontally and/or vertically, which makes the architecture simple.

21 Claims, 5 Drawing Sheets

U.S. PATENT DOCUMENTS

| | | | |
|---|---|---|---|
| 6,167,164 | A | 12/2000 | Lee |
| 6,188,799 | B1 | 2/2001 | Tan et al. |
| 6,226,050 | B1 | 5/2001 | Lee |
| 6,229,929 | B1 | 5/2001 | Lynch et al. |
| 6,240,135 | B1 | 5/2001 | Kim |
| 6,285,801 | B1 | 9/2001 | Mancuso et al. |
| 2001/0003545 | A1 | 6/2001 | Hong |
| 2001/0019634 | A1 | 9/2001 | Lainema et al. |

OTHER PUBLICATIONS

A projection–based post–processing technique to reduce blocking artifact using a priori information on DCT coefficients of adjacent blocks,Hoon Paek; Sang–Uk Lee; Image Processing, 1996. Proceedings., International Conference on, vol. 1, Sep. 16–19, 1999.*

Blocking artifact reduction in frequency domain Triantafyllidis, G.A.; Tzovaras, D.; Strintzis, M.G.; Image Processing, 2001. Proc. 2001 International Conference on vol. 1, Oct. 7–10, 2001 Page(s):269–272.*

Removal of blocking and ringing artifacts using transform domain denoising Eginzarian, K.; Helsingius, M.; Kuosmanen, P.; Astola, J.; Circuits and Systems, 1999. ISCAS '99. Proc. of the 1999 IEEE Int. Symp. on vol. 4, May 30–Jun. 2, 1999.*

* cited by examiner

Fig. 6(a)

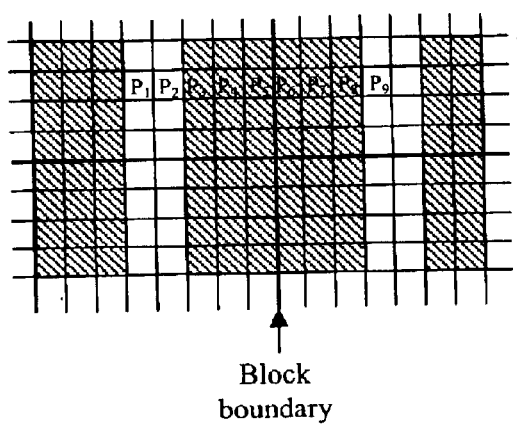

Block boundary

Fig. 6(b)

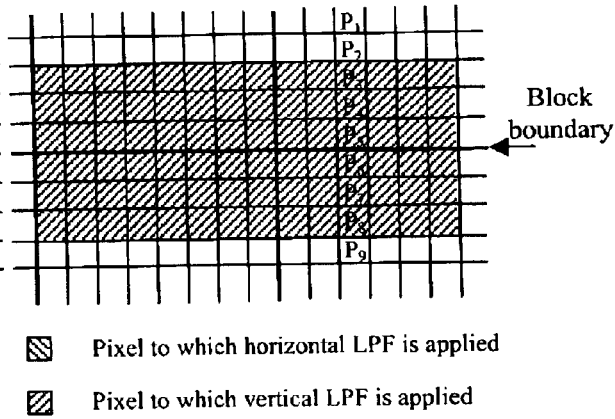

Block boundary

▧ Pixel to which horizontal LPF is applied
▨ Pixel to which vertical LPF is applied

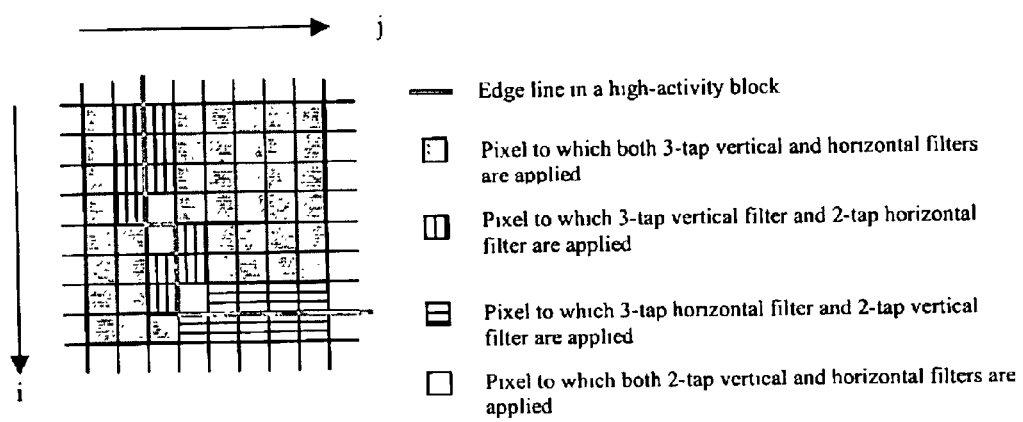

— Edge line in a high-activity block

☐ Pixel to which both 3-tap vertical and horizontal filters are applied

⊟ Pixel to which 3-tap vertical filter and 2-tap horizontal filter are applied

⊟ Pixel to which 3-tap horizontal filter and 2-tap vertical filter are applied

☐ Pixel to which both 2-tap vertical and horizontal filters are applied

Fig. 7

HYBRID TECHNIQUE FOR REDUCING BLOCKING AND RINGING ARTIFACTS IN LOW-BIT-RATE CODING

RELATED APPLICATION DATA

This application is related to application Ser. No. 10/037,767, filed on Oct. 23, 2001 and entitled "Reducing Blocking and Ringing Artifacts in Low-Bit-Rate Coding," the contents of which are incorporated by reference herein.

BACKGROUND OF THE INVENTION

1. Field of the Invention

This present invention relates to a power-scalable hybrid algorithm for smoothing artificial discontinuities between image blocks (blocking artifacts) and reducing ringing noise, without introducing undesired blur. More particularly, the algorithm of the present invention performs compressed-domain-based de-blocking in areas where blocky artifacts are most noticeable, which may be followed by spatial domain processing in which further de-blocking and de-ringing are performed, subject to need and available resources such as battery or computation power. The invention, which can be embodied in an apparatus, methods or programs of instructions, is particularly, though not exclusively, designed for low-bit-rate video coding applications.

2. Description of the Related Art

Recently, the emerging low bit-rate video coding schemes, such as ITU-T H.263 and MPEG-4, have required more efficient and effective algorithms to reduce annoying blocking and ringing artifacts. By the nature of block-based coding, monotone areas of the original image, where the pixel intensity is changing gradually, suffer most noticeably from the abrupt changes across the block boundary, leading to blocking artifacts. In terms of the discrete cosine transform (DCT), when the DCT coefficient quantization step size is above the threshold for visibility, discontinuities in grayscale values are caused by removal of AC coefficients due to quantization and become clearly visible at the boundaries between blocks. Also, visually annoying noise may exist near real edges. Such noise is called ringing noise and is inevitable in the block-based discrete cosine transform (DCT) scheme. Since these artifacts cause substantial practical problems, reduction of those artifacts is essential in applications using low bit-rate coded video sources, such as mobile terminals including video phones and PDAs. Many de-blocking schemes have been proposed in still image coding, such as JPEG, under the assumption that blocking artifacts are always located at block boundaries. A well-known method for reducing blocking artifacts is based on the theory of alternative projection onto convex sets (POCS). However, this method can only be applied to still images because of an iteration structure and long convergence time.

Recently, post-filtering methods for low bit-rate coded video have been proposed. In video coding, unlike in still image coding, blocking artifacts may occur inside a block since the blocking artifacts of the previous frame can be propagated to arbitrary positions in the current frame. Selective filtering methods using local characteristics have been proposed. The basic idea is to classify pixels or blocks into two categories in order to apply filters adaptively. One reported method involves a de-blocking filter with two separate modes, which are selected on the pixel behavior around the block boundary. However, reducing ringing noise is not considered. In another proposal, a frequency-domain analysis is conducted for extraction of the block semaphores from the intracoded picture. The semaphores extracted are propagated using inverse motion compensation for inter-frame de-blocking and de-ringing.

Objects and Summary of the Invention

Objects of the Invention

A main object of the present invention is to provide an efficient and effective power-scalable hybrid technique for reducing blocking and ringing artifacts from still images or video frames based on local characteristics.

It is another object of this invention to reduce the blocking and ringing artifacts based on local image characteristics using a hybrid scheme. First, simple de-blocking for low-activity blocks, where blocky effects are most noticeable, is conducted in the compressed domain. This may be followed by spatial domain processing where the de-blocking for the low-activity blocks is refined and both de-blocking and de-ringing are achieved in high-activity blocks. The spatial domain processing is performed subject to need and available resources such as battery or computation power.

SUMMARY OF THE INVENTION

According to one aspect of this invention, a method for reducing artifacts in digital data. The method involves performing inverse motion compensation on transform-domain blocks of a previous frame of the digital data; generating a plurality of transform-domain blocks representing a difference between a current frame's transform-domain blocks and the previous frame's inverse motion compensated transform-domain blocks; combining the plurality of difference transform-domain blocks previously generated with the previous frame's inverse motion compensated transform-domain blocks to generate a plurality of reconstructed transform-domain blocks representing the current frame of the digital data, each reconstructed block comprised of a DC coefficient and a plurality of AC coefficients; classifying each block in the current frame as either a first type or a second type based on the transform-domain AC coefficients in that block; predicting select lower frequency AC coefficients of each block in the current frame using the DC coefficient for that block and a select number of DC coefficients in adjacent blocks; and performing de-blocking on each block of the first type of the current frame in the transform domain by inserting into that block the predicted AC coefficients for that block.

Preferably, the five lowest frequency AC coefficients are predicted for each pixel block.

Preferably, the classifying of each block comprises comparing the estimated activity of that block to a preset threshold, classifying a particular block as of the first type if the estimated activity of that block is less than the threshold, and, if not, classifying the block as of the second type.

In accordance with the power-scalable feature of the invention, the method may further comprise the step of selectively performing a low-pass filtering operation on select pixels in select pixel blocks of the digital data on a block-by-block basis based on the classification of that block, the locations and values of non-zero AC coefficients in the corresponding partial transform block, and certain pixel values in that block. Such filtering may comprise applying a strong low-pass filter to boundary region pixels in select first-type blocks and applying a weak low-pass filter to pixels in select second-type blocks.

For each block of the first type, the strong low-pass filter is preferably applied to smooth boundary region pixels in both the horizontal and vertical directions if all of the predicted AC coefficients in the corresponding partial transform-coefficient block have absolute values less than a predetermined value; to smooth boundary region pixels in the vertical direction if at least one AC coefficient in a first select location in the corresponding partial transform-coefficient block has an absolute value greater than or equal to the predetermined value; and to smooth boundary region pixels in the horizontal direction if at least one AC coefficient in a second location in the corresponding partial transform-coefficient block has an absolute value greater than or equal to the predetermined value.

For each block of the first type, the strong low-pass filter is preferably applied to a current boundary region pixel only when a difference between a maximum pixel value and a minimum pixel value among a predetermined number of pixels centered on the current boundary region pixel is less than a predetermined parameter.

For each block of the second type, the weak low-pass filter is preferably applied to smooth pixels inside the block in the horizontal direction if a difference between values of a first two adjacent pixels and a difference between values of a second two adjacent pixels are both less than a predetermined parameter and is applied to smooth pixels inside the block in the vertical direction if a difference between values of a third two adjacent pixels and a difference between values of a fourth two adjacent pixels are both less than the predetermined parameter.

In another aspect, the invention involves a decoder which comprises an input unit that receives an encoded bit stream representing the difference between a current frame and a previous frame that has been inverse motion compensated and generates a plurality of transform-domain blocks representing a difference between a current frame's transform-domain blocks and the previous frame's inverse motion compensated transform-domain blocks; a motion compensation module that performs motion compensation on transform-domain blocks of a previous frame of the digital data; a summer that combines the plurality of difference transform-domain blocks generated by the input unit with the previous frame's inverse motion compensated transform-domain blocks; a run length decoder which receives the output of the summer and generates a plurality of reconstructed transform-domain blocks representing the current frame of the digital data, each reconstructed block comprised of a DC coefficient and a plurality of AC coefficients; wherein each block in the current frame is classified as either a first type or a second type based on the transform-domain AC coefficients in that block; wherein select lower frequency AC coefficients of each block in the current frame are predicted using the DC coefficient for that block and a select number of DC coefficients in adjacent blocks; and wherein de-blocking is performed on each block of the first type of the current frame in the transform domain by inserting into that block the predicted AC coefficients for that block.

Preferably, the input unit comprises a variable length decoder which receives the encoded bit stream and a dequantizer that receives an output of the variable length decoder and generates the plurality of transform-domain blocks representing the difference between a current frame's transform-domain blocks and the previous frame's inverse motion compensated transform-domain blocks.

Preferably, the decoder further comprises an inverse transform module that receives the plurality of reconstructed transform-domain blocks representing the current frame of the digital data from the run length decoder and generates decoded digital data.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6(a) is a schematic diagram illustrating the pixel locations in low activity blocks to which strong horizontal low-pass filtering is applied; and FIG. 6(b) is a schematic diagram illustrating the pixel locations in low activity blocks to which strong vertical low-pass filtering is applied.

FIG. 7 is a schematic diagram illustrating the pixel locations to which weak low-pass filters are applied in high-activity blocks.

DESCRIPTION OF THE PREFERRED EMBODIMENTS

A. Overview

Figure 1:
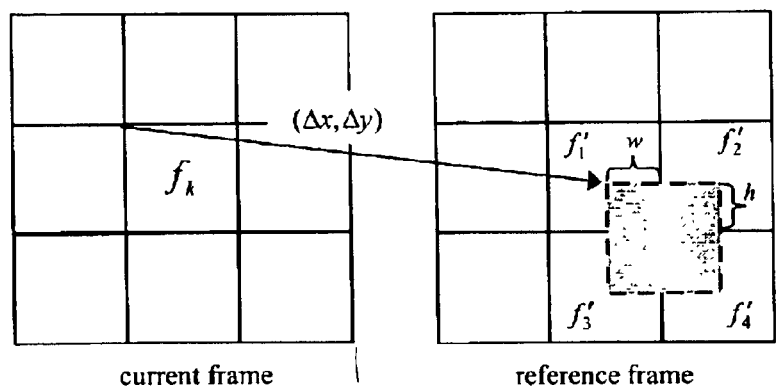
FIG. 1 is a schematic diagram illustrating motion compensation in the spatial domain.

The present invention provides a power-scalable hybrid technique (e.g., an algorithm) to reduce blocking and ringing artifacts in low bit-rate block-based coding, and is particularly applicable to such video coding. First, simple de-blocking for low-activity blocks, where blocky artifacts are most noticeable, is performed in the compressed domain. AC coefficients in those blocks that are lost because of dequantization are replaced in accordance with the invention. This may be followed by spatial domain processing—hence the designation "hybrid"—where de-blocking of the low-activity blocks is refined and both de-blocking and de-ringing are performed on high-activity blocks. In accordance with the "power-scalable" feature of the invention, the spatial domain processing can be omitted depending on degree of improvement desired and depending on available resources such as battery or computational power. The algorithm will now be explained in detail.

B. Hybrid Scheme for De-blocking and De-ringing

Consider an image f which has K blocks, each of size N×N. A pixel value at (i,j), $0 \leq i,j \leq N-1$, in the $k^{th}$ block, $1 \leq k \leq K$, is denoted by $f_k(i,j)$ where the blocks are numbered sequentially from 1 in a raster-scan order beginning at the top left and ending at the bottom right. The $k^{th}$ block of the image, $f_k(i,j)$, $0 \leq i,j \leq N-1$, is transformed to $f_k(u,v)$, $0 \leq u, v \leq N -1$, where $(i,j)$ and $(u,v)$ are coordinate indexes, respectively, in the spatial and transform domains.

In the spatial domain, the mean variance can be used to determine the characteristic of the original $k^{th}$ block, where the mean variance is expressed by $$\sigma_k^2 = \sum_{i=0}^{N-1}\sum_{j=0}^{N-1}(f_k(i,j) - \mu_k)^2$$

and $\mu k$ is the mean of $f_k$. From Parseval's energy theorem, the mean variance can be directly calculated from the sum of the square of the AC components in the compressed domain, i.e., $$\sigma_k^2 = \frac{1}{N^2}\left(\sum_{u=0}^{N-1}\sum_{v=0}^{N-1}F_k(u,v)^2 - F_k(0,0)^2\right).$$

To reduce computation, the estimated standard deviation is approximated by the mean absolute values as $$\sigma_k = \frac{1}{N}\left(\sum_{u=0}^{N-1}\sum_{v=0}^{N-1}|F_k(u,v)| - |F_k(0,0)|\right). \quad (1)$$

Using a previously-proposed fast DCT domain inverse motion compensation method, described in sub-section B.1, the algorithm can fully exploit DCT coefficients for every block. The DCT blocks are reconstructed and, therefore, AC coefficients can be exploited to compute the block activity using Eq. (1). In subsection B.2, each block is classified as either a low- or high-activity block based on the AC coefficients provided from sub-section B.1. For low-activity blocks, the AC coefficients which were lost because of dequantization are replaced to achieve de-blocking in the compressed domain. The spatial domain post-processing is followed and explained in subsection B.3.

B.1 DCT-domain Inverse Motion Compensation

Since the TMN8 decoder for H.263+ performs motion compensation in the spatial domain, a brute force approach for the algorithm of this invention is to transform each reconstructed frame back to the compressed domain for frequency characteristic analysis. In order to reduce the computational burden of transforming between the spatial and compressed domains, the invention processes the video entirely in the frequency domain. Any known fast DCT-domain inverse motion compensation algorithm can be used. For example, the motion compensation described below can be used.

In FIG. 1, the current 8×8 spatial block, $f_k$, is derived from the four reference blocks in the reference frame, $f_1', \ldots, f_4'$. The reference blocks are selected by calculating the displacement of $f_k$, by the motion vector $(\Delta x, \Delta y)$ and choosing those blocks that $f_k$ intersects in the reference frame. For $(\Delta x>0, \Delta y>0)$, $f_k$ is displaced to the right and down. From the overlap of $f_k$ with $f_k'$ the overlap parameters (w,h) can be determined; the parameters (8−w,h), (w,8−h), and (8−w,8−h) with the neighboring blocks can also be determined. Since each block can be represented as an 8×8 matrix, the reconstruction of $f_k$ can be described as the summation of windowed and shifted versions of $f_k', \ldots, f_4'$.

$$f_k = \sum_{i=1}^{4} c_{i1} f_i' c_{i2} \quad (2)$$

where $c_{ij}$, i=1, ..., 4, j=1,2, are sparse 8×8 matrices of zeroes and ones. In particular, $c_{ij}$ is a function of the overlap parameters (w,h) and is defined as $$c_{11} = c_{21} = U_h = \begin{pmatrix} 0 & I_h \\ 0 & 0 \end{pmatrix}, \quad (3)$$

$$c_{12} = c_{32} = L_w = \begin{pmatrix} 0 & 0 \\ I_w & 0 \end{pmatrix}, \quad (4)$$

where $I_h$, and $I_w$ are identity matrices of dimension h×h and w×w, respectively. Similarly, $$c_{31} = c_{41} = I_{8-h}, \quad (5)$$

$$c_{22} = c_{42} = I_{8-w}. \quad (6)$$

The problem of motion compensation in the compressed domain has been previously studied. The main idea is to reconstruct $F_k$, the DCT of $f_k$, directly from $F_1', \ldots, F_4'$, the DCT of $f_1', \ldots, f_4'$. Using the unitary property of the DCT transform, $S'S=I$, it can be seen that Eq. (2) is equivalent to $$f_k = \sum_{i=1}^{4} c_{i1} S' S f_i' S' S c_{i2}. \quad (7)$$

Next, pre-multiplying both sides of Eq. (7) by S, and post-multiplying by $S^t$, yields $$F_k = \sum_{i=1}^{4} C_{i1} F_i' C_{i2}, \quad (8)$$

where $C_{ij}$ is the DCT of $c_{ij}$. Eq. (8) describes a method to calculate $F_k$ from $F_1', \ldots, F_4'$. Each term of the summation is pre- and post-multiplied with a single matrix $C_{ij}$ without having to explicitly transform between the spatial and frequency domains. It was previously proposed to pre-compute the fixed matrices $C_{ij}$. There are a total of 16 possibilities. Although the matrices $C_{ij}$ are not sparse, most of the computational savings are derived from the alignment of the current block to the reference block. There are three cases of alignment: (a) perfect alignment (w=8, h=8); (b) vertical alignment (w=8); and (c) horizontal alignment (h=8). In the first case, no computation is necessary, and the DCT coefficients can be simply copied. In the latter two cases, the summation in Eq. (8) contains only two terms instead of four.

A fast algorithm has previously been proposed for calculating Eq. (8). It was noticed that the matrices $C_{ij}$ can be factored into a sequence of sparse matrices. The DCT matrix S can be factored as follows:

$$S = DPB_1B_2MA_1A_2A_3, \quad (9)$$

where

D is a diagonal matrix of real terms;
P is a permutation matrix;
A, B is a sparse matrix of ones and zeros; and
M is a sparse matrix with real terms.

The best way to include the factorization is to precompute the matrices $J_1$, $K_1$:

$$J_1 = U_1(MA_1A_2A_3), \quad i=1,2,\ldots,8 \qquad (10)$$

$$K_1 = L_1(MA_1A_2A_3), \quad i=1,2,\ldots,8 \qquad (11)$$

Next, $F_k$ is computed by expanding the summation in Eq. (8) and substituting Eq. (10) and Eq. (11), $$F_k = S[J_h B_2^t B_1^t P^t D(F_1' DPB_1 B_2 J_w^t + F_2' DPB_1 B_2 K_{8-w}^t) + \qquad (12)$$
$$K_{8-h} B_2^t B_1^t P^t D(F_3' DPB_1 B_2 J_w^t + F_4' DPB_1 B_2 K_{8-w}^t)] S^t.$$

The computational complexity of Eq. (12) can be calculated as follows. The diagonal matrix D and $D^{-1}$ can be absorbed into the quantization step and thus ignored. The permutation matrix P and $P^{-1}$ cause only changes in the ordering and thus ignored. The main computation occurs in multiplying with the matrices $B_1$ and $J_1$. In the case of $B_1$, the sparseness of the matrix leads to few multiplications and in the case of $J_1$ the sparseness of the matrix can be rewritten as sequences of equations with only 5 multiplications and 22 additions.

Figure 2:
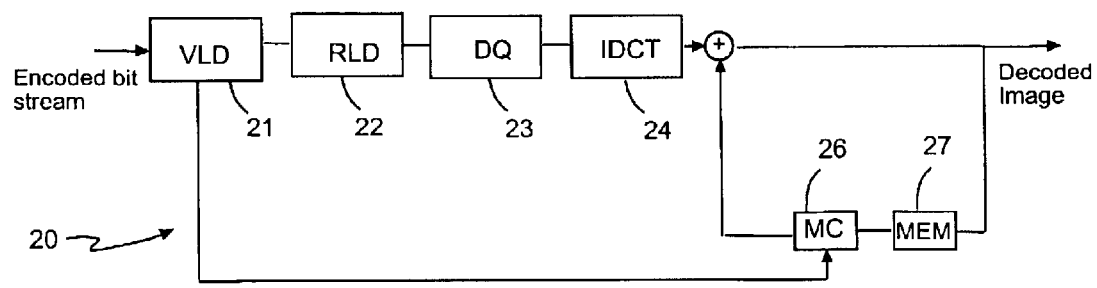
FIG. 2 is a block diagram illustrating a conventional decoder structure.
Figure 3:
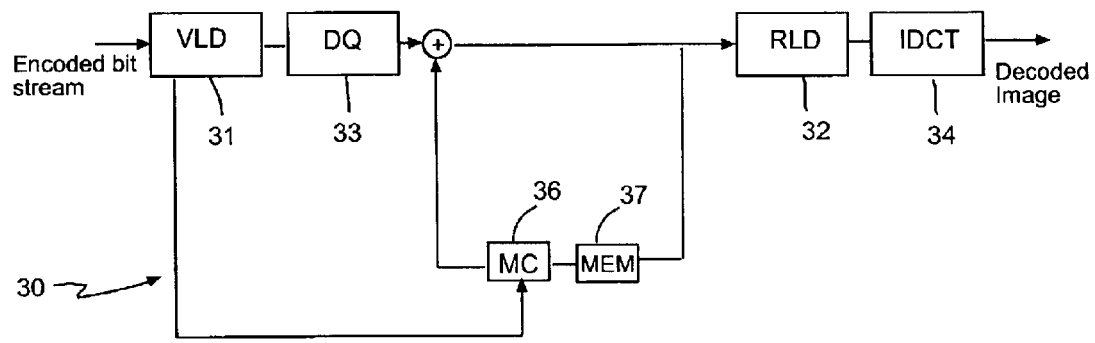
FIG. 3 is a block diagram illustrating a decoder structure in accordance with the invention.

FIGS. 2 and 3 schematically illustrate the original structure of the H.263 decoder and modified structure for DCT domain motion compensation, respectively. As shown in FIG. 2, in the original H.263 Decoder 20, the pipeline for the encoded bit stream is processed by a Variable Length Decoder (VLD) 21, Run Length Decoder (RLD) 22, Dequantizer (DQ) 23, and an Inverse Discrete Cosine Transform (IDCT) 24 in that order.

It is noted that the encoded bit stream input to VLD 21 is an error signal for inter-coded frames. That is, each segment of data in the inputted encoded bit stream represents the difference between a current frame and a previous frame that has been inverse motion compensated. The error signal is decoded by VLD 21, and the result is transmitted to RLD 22 and also to a Motion Compensation (MC) unit 26.

The output of IDCT 24 is fed to a summer 25 where it is summed with a motion compensated version of the last frame output from MC unit 26 which it constructs from the signal received from VLD 21 and the previous frame that is fed back and temporarily stored in Memory (M) 27.

Compare the pipeline of the decoder 30 modified for DCT domain motion compensation as shown in FIG. 3. The encoded bit stream (error signal in the case of inter-coded frames) is first processed by VLD 31, the result of which is transmitted to both DQ 33 and to MC 36. The output of DQ 33 is then fed to summer 35 where it is summed with the motion compensated version of the last frame output from MC unit 36 which it constructs from the signal received from VLD 31 and the previous frame that is fed back and temporarily stored in Memory (M) 37. M 37 is preferably a single frame buffer. The output of summer 35 is run length decoded in RLD 32 to generate reconstructed DCT blocks including reconstructed AC coefficients. The DCT blocks undergo the inverse discrete cosine transform operation in IDCT 34 to produce the decoded image.

B.2 Block Classification and De-blocking in the Compressed Domain

The reconstructed AC coefficients output from the RLD in FIG. 3 definitely provide information about block activity. By ignoring the scale factor from Eq. (1), the standard deviation, i.e., the block activity of the $k^{th}$ block is expressed as $$ACT_k = \left(\sum_{u=0}^{N-1}\sum_{v=0}^{N-1} |F_k(u,v)| - |F_k(0,0)|\right). \qquad (13)$$

Note that this approximation requires, at most, $N^2-2$ additions while the calculation in the spatial domain requires $N^2$ multiplications and $(3N^2-2)$ additions for a block with N×N pixels. The number of additions can be reduced if the AC coefficients are directly taken from the run length code prior to RLD. If the estimated block activity of the $k^{th}$ block is less than a preset threshold value, the $k^{th}$ block in the image is naturally assumed to be a low-activity block. Otherwise, the block is assumed to be a high-activity block. Symbolically, $$\begin{cases} \text{if } (ACT_k < \theta), & \text{low-activity block} \\ \text{otherwise}, & \text{high-activity block} \end{cases} \qquad (14)$$

Figure 4:
FIG. 4 is an image with recognized high-activity blocks marked.

FIG. 4 is an image showing block classification results, where the upper left points of the high-activity blocks are marked.

While AC coefficients are accessible from the DCT blocks and usable for block classification, they do not exactly reflect the spatial activity of the original block due to quantization in the encoding process and the natural loss of small AC coefficients due to quantization results in noticeable blocking artifacts. An AC prediction method has been proposed to reduce blocking artifacts in JPEG image. In this approach, the image is assumed to be a quadratic surface, and the missing low frequency coefficients are predicted to fit the surface. However, this model is not valid in areas with sharp intensity transitions, but is effective in smooth areas. Since the smooth areas have most of the noticeable blocking artifacts, the low frequency coefficients in the low-activity blocks can be replaced by the predicted AC coefficients. Those coefficients are predicted from the DC coefficient changes within a 3×3 array of blocks centered on the block in question.

A quadratic surface, given by $$P(x,y) = A_1 x^2 y^2 + A_2 x^2 y + A_3 xy^2 + A_4 x^2 + A_5 xy + A_6 y^2 + A_7 x + A_8 y + A_9 \qquad (15)$$

is fitted to the 3×3 array of DC values (see FIG. 5($a$)); and is used to estimate the 8×8 pixel array in the central block. The coefficients $A_1$, $A_9$ are determined by requiring that the mean values computed for the quadratic surface match the DC values, $DC_1$, $DC_9$, with appropriate scaling for the DCT normalization.

If a DCT is computed for the central block, the result is a set of equations relating the AC coefficients required to reproduce the quadratic surface to the DC coefficients which predict the quadratic surface. The equations for the first five predicted coefficients in the zigzag scan are:

$$AC_{01} = (1.13885)(DC_4 - DC_6)$$
$$AC_{10} = (1.13885)(DC_2 - DC_8)$$
$$AC_{20} = (0.27881)(DC_2 + DC_8 - 2DC_5)$$
$$AC_{11} = (0.16213)((DC_1 - DC_3) - (DC_7 - DC_9))$$
$$AC_{02} = (0.27881)(DC_4 + DC_6 - 2DC_5) \qquad (16)$$

Figures 5A, 5B:
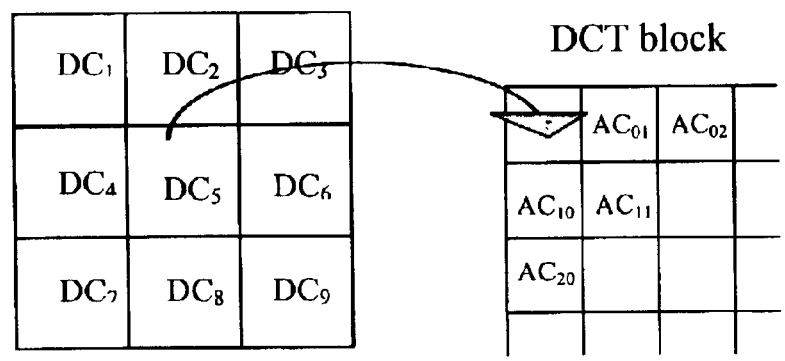
FIG. 5(a) is a 3×3 array of DC coefficients used for AC coefficients prediction.
FIG. 5(b) is the central DCT block with five predicted AC coefficients.

The subscripts of the AC coefficients indicate the horizontal and vertical position of the coefficient in the DCT array (see FIG. 5(b)). As mentioned above, the predicted AC coefficients replace lost AC coefficients in low-activity blocks.

B.3 Post-processing in the Spatial Domain

Due to the limitation of the AC prediction scheme, only AC coefficients in the low-activity blocks are replaced as previously explained. This reduces noticeable blocky effects in the smooth areas. However, in accordance with the power-scalable feature of this invention, adaptive low-pass filtering may be performed in the spatial domain, when further reduction of blocking and ringing effects is desired and the resources are available for such additional processing.

The spatial domain post-processing involves performing adaptive low-pass filtering on certain reconstructed blocks, on a block-by-block basis, depending on block classification, the locations of the predicted non-zero AC coefficients, and certain pixel values, as described below.

For the low-activity blocks, a one-dimensional (1-D) strong (e.g., 7-tap) low-pass filter (LPF) is applied to boundary region pixels, along all of the horizontal and vertical edges. The predicted AC coefficients can also be exploited for selective application of horizontal and/or vertical strong LPFs depending on the locations and absolute values of the predicted AC coefficients. Such coefficients reflect spatial activity of the original block and are assumed to be the unquantized coefficients of the intra-coded blocks. Since the quantization formula used for intra-coded blocks is:

$$Q(coeff) = \text{sign}(coeff) \times \left( \frac{|coeff|}{2QP} \right) \quad (17)$$

$$\text{where sign}(coeff) = \begin{cases} -1, & coeff < 0 \\ 0, & coeff = 0 \\ +1, & coeff > 0 \end{cases}$$

and QP is a quantization parameter that is determined in the encoding stage by the user, the blocks which have predicted coefficients whose absolute values are less than 2×QP are expected to have blocking artifacts in the decoded frame.

In one embodiment, for each low-activity block, three situations are considered for strong low-pass filtering. When all of the predicted AC coefficients have absolute values less than 2×QP, it is assumed that the 64 pixels of the 8×8 decoded block have the same values in the spatial domain; therefore, such a block is a candidate for having a strong LPF applied to it in both the horizontal and vertical directions. When only the predicted coefficients for position $AC_{01}$ and/or position $AC_{02}$ of the 8×8 inverse quantized block have absolute values greater than or equal to 2×QP, it is expected that the eight pixels in each column have the same value in the spatial domain, while there exists fluctuation along each row. This block may induce blocking artifacts at the top and the bottom of the block, and hence is a candidate for having a strong LPF applied to it in the vertical direction. When only the predicted coefficients for position $AC_{10}$ and/or position $AC_{20}$ have absolute values greater than or equal to 2×QP, it is expected that the eight pixels in each row have the same values in the spatial domain, while there exists fluctuation along each column. This block may induce blocking artifacts at the left and the right of the block, and hence is a candidate for having a strong LPF applied to it in the horizontal direction.

The coefficients of such a strong LPF are preferably as follows:

$$h(n) = \frac{1}{8}\{1, 1, 1, 2, 1, 1, 1\} \quad (18)$$

and filtering is performed, subject to the below-described condition, on boundary region pixels, that is, three rows/columns of pixels on either side of the block boundary. FIGS. 6(a) and 6(b) show the pixel locations to which the horizontal and vertical LPFs are respectively applied in low-activity blocks. Sometimes a block containing real edges may be classified as a low-activity block, which may occur when the DC value of the block is very similar to those of neighbor blocks. Thus, to prevent real edges in the low-activity-classified block from being smoothed, the above-described low-activity-block filtering scheme is subject to the following condition. Specifically, filtering is not performed when the difference between the maximum pixel value and the minimum pixel value among nine pixels centered on the current pixel is greater than $k_1 \times QP$, where $k_1$ is preferably about 1, but may range from about 1 to about 2. For instance, pixel $P_5$ shown in FIG. 6(a) is not low-pass filtered if $\max(p) - \min(p) > k_1 \times QP$, where $p = \{p_1, p_2, \ldots, p_8, p_9\}$.

Unlike low-activity areas, high-activity areas may have visually annoying ringing artifacts as well as blocking artifacts. The ringing noise occurs as a result of the Gibb's phenomenon due to truncation of the high frequency coefficients by quantization, which is noticeable near the real edges which correspond to high-activity areas. Thus, the filtering in the high-activity areas needs to reduce ringing noise as well as blocking artifacts, but without smoothing real edges. A weak (e.g., 3-tap or 2-tap) LPF is chosen for this task. The filter coefficients are preferably as follows:

$$h_3(n) = \frac{1}{4}\{1, 2, 1\} \text{ and } h_2(n) = \frac{1}{2}\{1, 1\} \quad (19)$$

Horizontal and/or vertical filtering is performed on pixels in the high-activity as long as the difference between adjacent pixels values under the filter is less than $k_2 \times QP$, where $k_2$ is preferably about 1.5, but may range from about 1 to about 2. In detail, if $DH_1$ and $DH_2$ are less than $k_2 \times QP$, the 3-tap horizontal filter is applied on the current pixel. If either $DH_1$ or $DH_2$ is not less than $k_2 \times QP$, it is assumed that there is a real edge point, and thus the 2-tap horizontal averaging filter is applied on the current pixel and each adjacent pixel whose value is different from the current pixel by less than $k_2 \times QP$. 3-tap and 2-tap vertical filters are applied in the same way as the horizontal filters. FIG. 7 schematically illustrates the pixel positions to which the horizontal and/or vertical 3-tap or 2-tap filters are applied. This filtering process can be summarized as follows:

if $((DH_1 < k_2 \times QP)$ and $(DH_2 < k_2 \times QP))$, then do 3-tap horizontal filtering, else if $(((DH_1 < k_2 \times QP)$ and $(DH_2 \geq k_2 \times QP))$ or $((DH_1 \geq k_2 \times QP)$ and $(DH_2 < k_2 \times QP)))$, then do 2-tap horizontal filtering, if $((DV_1 < k_2 \times QP)$ and $(DV_2 < k_2 \times QP))$, then do 3-tap vertical filtering, else if $(((DV_1 < k_2 \times QP)$ and $(DV_2 \geq k_2 \times QP))$ or $((DV_1 24\ k_2 \times QP)$ and $(DV_2 < k_2 \times QP)))$ then do 2-tap vertical filtering, where $$DH_1=|f(i,j)-f(i,j-1)|$$

$$DH_2=|f(i,j)-f(i,j+1)|$$

$$DV_1=|f(i,j)-f(i-1,j)|$$

$$DV_2=|f(i,j)-f(i+1,j)|$$

These filters applied to block boundaries reduce the blocking artifacts and reduces ringing noise as well inside the block. This filtering scheme efficiently performs de-ringing as well as weak filtering in the high-activity blocks.

Figure 8:
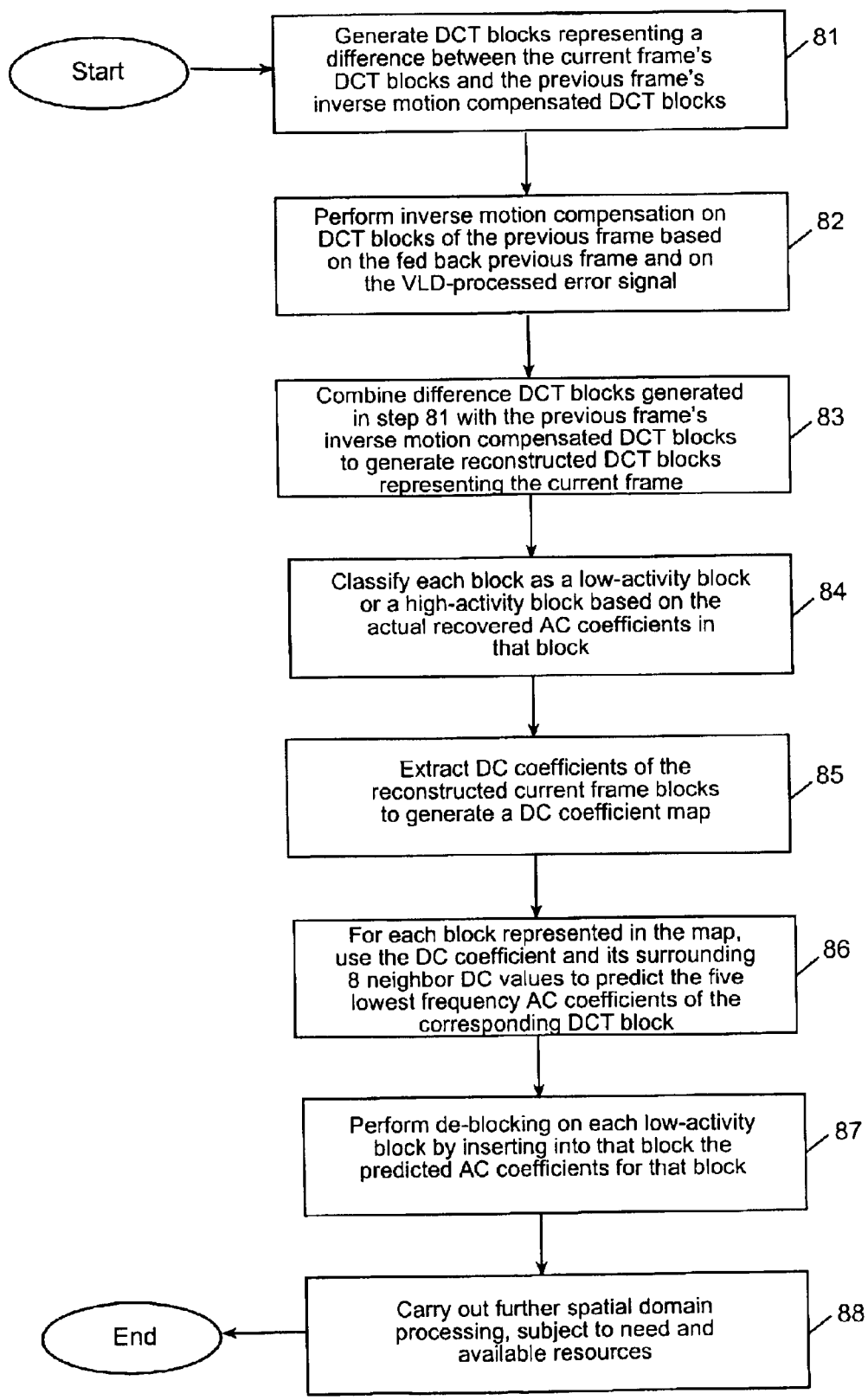
FIG. 8 is a flow chart illustrating certain process steps of the algorithm in accordance with embodiments of the invention.

A flow chart, shown in FIG. 8, summarizes the algorithm in accordance with embodiments of the invention. The encoded bit stream input to VLD 31 is an error signal. That is, each segment of data in the inputted encoded bit stream represents the difference between a current frame and a previous frame that has been inverse motion compensated. Thus, initially, DCT blocks representing a difference between the current frame's DCT blocks and the previous frame's inverse motion compensated DCT blocks is generated in step 81. Also, inverse motion compensation is performed on DCT blocks of the previous frame based on the fed back previous frame and on the VLD-processed error signal (step 82).

Next, in step 83, the difference DCT blocks generated in step 81 are combined with the previous frame's inverse motion compensated DCT blocks to generate reconstructed DCT blocks representing the current frame of the digital representation. Based on the actually recovered AC coefficients in a particular block, that block is classified as either a low-activity or a high-activity block in step 84.

The DC coefficients of the reconstructed current frame blocks are extracted to generate a DC coefficient map (step 85). Next, in step 86, for each block represented in the map, the DC value and its surrounding eight neighbor DC values are used to predict the five lowest-frequency (and usually missing) AC coefficients of the corresponding DCT block. In step 87, de-blocking is performed on each low-activity block by inserting into that block some or all of the predicted AC coefficients for that block.

Subject to need and available resources, further spatial domain processing may be carried out in step 88, as previously described.

The processing steps 81–87 of FIG. 8 are carried out for each frame until all frames have been processed. The spatial domain processing of step 88, although done on a block-by-block basis, may be performed after all of the frames have been processed in the frequency domain, that is, after all of the frames have been processed according to steps 81–87.

C. Effects and Implementations

As the foregoing description demonstrates, the present invention provides a power-scalable hybrid de-blocking and de-ringing algorithm which is a fast and computationally efficient and which is particularly applicable to low-bit-rate block-based video coding. The algorithm is robust to different images and compression schemes. Moreover, because of its relatively simple architecture, the algorithm can be implemented in real-time applications such mobile video phone systems. The algorithm may be conveniently embodied in the form of software that can be used with an existing coding scheme, such as MPEG-4 and ITU-T H.263.

Figure 9:
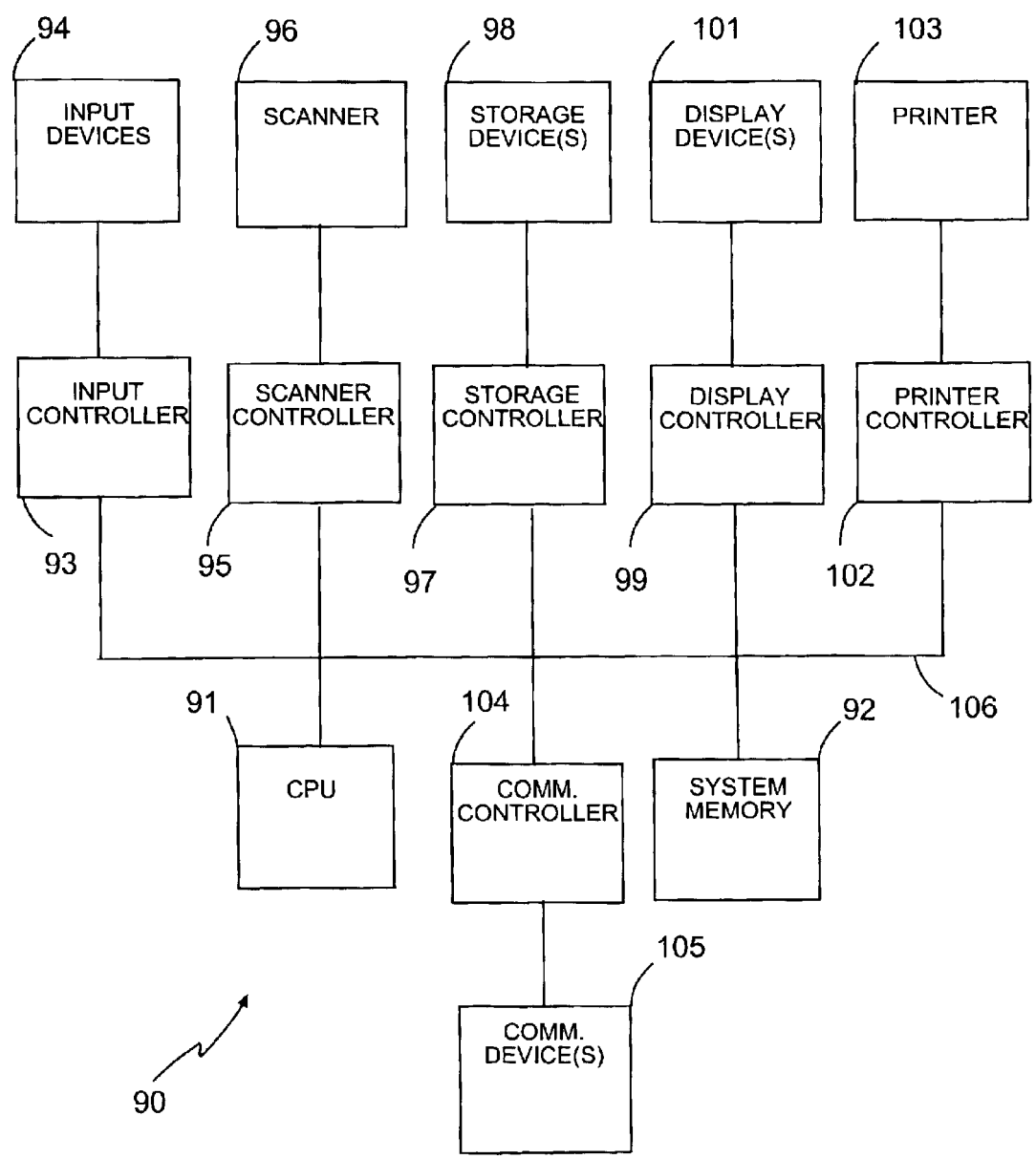
FIG. 9 is a block diagram illustrating components in an exemplary image processing system that may be used to implement aspects of the present invention.

FIG. 9 illustrates a typical system which may be used to "run" the de-blocking and de-ringing algorithm of the present invention. As illustrated in FIG. 9, system 90 includes a central processing unit (CPU) 91 that provides computing resources and controls the computer. CPU 91 may be implemented with a microprocessor or the like, and may also include a graphics processor and/or a floating point coprocessor for mathematical computations. System 90 further includes system memory 92 which may be in the form of random-access memory (RAM) and read-only memory (ROM).

A number of controllers and peripheral devices are also provided, as shown in FIG. 9. Input controller 93 represents an interface to one or more input devices 94, such as a keyboard, mouse, stylus or remote control. There is also a controller 95 which communicates with a scanner 96 or equivalent device for digitizing documents including images to be processed in accordance with the invention. A storage controller 97 interfaces with one or more storage devices 98 each of which includes a storage medium such as magnetic tape or disk, or an optical medium that may be used to record programs of instructions for operating systems, utilities and applications which may include embodiments of programs that implement various aspects of the present invention. Storage device(s) 98 may also be used to store data to be processed in accordance with the invention. A display controller 99 provides an interface to a display device 101 which may be a cathode ray tube (CRT), thin film transistor (TFT) display, or video player. A printer controller 102 is also provided for communicating with a printer 103 for printing documents including images processed in accordance with the invention. A communications controller 104 interfaces with a communication device 105 which enables system 90 to connect to remote devices through any of a variety of networks including the Internet, a local area network (LAN), a wide area network (WAN), or through any suitable electromagnetic carrier signals including infrared signals.

In the illustrated embodiment, all major system components connect to bus 106 which may represent more than one physical bus. However, it should be noted that while all system components may typically be located in physical proximity to one another, such is not a requirement of the invention. For example, the input data (e.g., reconstructed frame(s)) and/or the output data (e.g., de-blocked/de-ringed frame(s)) may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or other suitable electromagnetic carrier signals including infrared signals.

While the present invention may be conveniently implemented with software, a hardware implementation or combined hardware/software implementation is also possible. A hardware implementation may be realized, for example, using ASIC(s), digital signal processing circuitry, or the like. For example, a single ASIC can be fabricated that contains the appropriate hardware for performing the functions described herein. The term "apparatus" in the claims is intended to cover all such hardware implementations of the invention, as well as other super-set devices, such as a computer or a system of the type shown in FIG. 9, which embody the claimed elements in either hardware or software form.

With these implementation alternatives in mind, it is to be understood that the block and flow diagrams show the performance of certain specified functions and relationships thereof. The boundaries of these functional blocks have been defined herein for convenience of description. Alternate boundaries may be defined so long as the specified functions are performed and relationships therebetween are appropriately maintained. The diagrams and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for reducing artifacts in digital data, comprising the steps of:
   (a) performing inverse motion compensation on transform-domain blocks of a previous frame of the digital data;
   (b) generating a plurality of transform-domain blocks representing a difference between a current frame's transform-domain blocks and the previous frame's inverse motion compensated transform-domain blocks;
   (c) combining the plurality of difference transform-domain blocks generated in step (b) with the previous frame's inverse motion compensated transform-domain blocks to generate a plurality of reconstructed transform-domain blocks representing the current frame of the digital data, each reconstructed block comprised of a DC coefficient and a plurality of AC coefficients;
   (d) classifying each block in the current frame as either a first type or a second type based on the transform-domain AC coefficients in that block;
   (e) predicting select lower frequency AC coefficients of each block in the current frame using the DC coefficient for that block and a select number of DC coefficients in adjacent blocks; and
   (f) performing de-blocking on each block of the first type of the current frame in the transform domain by inserting into that block the predicted AC coefficients for that block.

2. The method of claim 1, further comprising the step of:
   (g) selectively performing a low-pass filtering operation on select pixels in select pixel blocks of the digital data on a block-by-block basis based on the classification of that block, the locations and values of non-zero AC coefficients in the corresponding partial transform block, and certain pixel values in that block.

3. The method of claim 1, wherein, in step (e), the five lowest frequency AC coefficients are predicted for each pixel block.

4. The method of claim 1, wherein the classifying of each block in step (d) comprises comparing the estimated activity of that block to a preset threshold.

5. The method of claim 4, wherein, in step (d), a particular block is classified as a block of the first type if the estimated activity of that block is less than the threshold, and, if not, the particular block is classified as a block of the second type.

6. The method of claim 2, wherein step (g) comprises applying a strong low-pass filter to boundary region pixels in select first-type blocks and applying a weak low-pass filter to pixels in select second-type blocks.

7. The method of claim 6, wherein, for each block of the first type, the strong low-pass filter is applied to
   smooth boundary region pixels in both the horizontal and vertical directions if all of the predicted AC coefficients in the corresponding partial transform-coefficient block have absolute values less than a predetermined value;
   smooth boundary region pixels in the vertical direction if at least one AC coefficient in a first select location in the corresponding partial transform-coefficient block has an absolute value greater than or equal to the predetermined value; and
   smooth boundary region pixels in the horizontal direction if at least one AC coefficient in a second location in the corresponding partial transform-coefficient block has an absolute value greater than or equal to the predetermined value.

8. The method of claim 7, wherein, for each block of the first type, the strong low-pass filter is applied to a current boundary region pixel only when a difference between a maximum pixel value and a minimum pixel value among a predetermined number of pixels centered on the current boundary region pixel is less than a predetermined parameter.

9. The method of claim 6, wherein, for each block of the second type, the weak low-pass filter is applied to smooth pixels inside the block in the horizontal direction if a difference between values of a first two adjacent pixels and a difference between values of a second two adjacent pixels are both less than a predetermined parameter and is applied to smooth pixels inside the block in the vertical direction if a difference between values of a third two adjacent pixels and a difference between values of a fourth two adjacent pixels are both less than the predetermined parameter.

10. A decoder, comprising:
    an input unit that receives an encoded bit stream representing the difference between a current frame and a previous frame that has been inverse motion compensated and generates a plurality of transform-domain blocks representing a difference between a current frame's transform-domain blocks and the previous frame's inverse motion compensated transform-domain blocks;
    a motion compensation module that performs motion compensation on transform-domain blocks of a previous frame of the digital data;
    a summer that combines the plurality of difference transform-domain blocks generated by the input unit with the previous frame's inverse motion compensated transform-domain blocks;
    a run length decoder which receives the output of the summer and generates a plurality of reconstructed transform-domain blocks representing the current frame of the digital data, each reconstructed block comprised of a DC coefficient and a plurality of AC coefficients;
    wherein each block in the current frame is classified as either a first type or a second type based on the transform-domain AC coefficients in that block;
    wherein select lower frequency AC coefficients of each block in the current frame are predicted using the DC coefficient for that block and a select number of DC coefficients in adjacent blocks; and
    wherein de-blocking is performed on each block of the first type of the current frame in the transform domain by inserting into that block the predicted AC coefficients for that block.

11. The decoder of claim 10, wherein the input unit comprises a variable length decoder which receives the encoded bit stream and a dequantizer that receives an output of the variable length decoder and generates the plurality of transform-domain blocks representing the difference between a current frame's transform-domain blocks and the previous frame's inverse motion compensated transform-domain blocks.

12. The decoder of claim 10, further comprising an inverse transform module that receives the plurality of reconstructed transform-domain blocks representing the current frame of the digital data from the run length decoder and generates decoded digital data.

13. A machine-readable medium having a program of instructions for directing a machine to perform processing for reducing artifacts in digital data, the program of instructions comprising:

(a) instructions for performing inverse motion compensation on transform-domain blocks of a previous frame of the digital data;

(b) instructions for generating a plurality of transform-domain blocks representing a difference between a current frame's transform-domain blocks and the previous frame's inverse motion compensated transform-domain blocks;

(c) instructions for combining the plurality of difference transform-domain blocks generated in instructions (b) with the previous frame's inverse motion compensated transform-domain blocks to generate a plurality of reconstructed transform-domain blocks representing the current frame of the digital data, each reconstructed block comprised of a DC coefficient and a plurality of AC coefficients;

(d) instructions for classifying each block in the current frame as either a first type or a second type based on the transform-domain AC coefficients in that block;

(e) instructions for predicting select lower frequency AC coefficients of each block in the current frame using the DC coefficient for that block and a select number of DC coefficients in adjacent blocks; and (f) instructions for performing de-blocking on each block of the first type of the current frame in the transform domain by inserting into that block the predicted AC coefficients for that block.

14. The machine-readable medium of claim 13, further comprising:

(g) instructions for selectively performing a low-pass filtering operation on select pixels in select pixel blocks of the digital data on a block-by-block basis based on the classification of that block, the locations and values of non-zero AC coefficients in the corresponding partial transform block, and certain pixel values in that block.

15. The machine-readable medium of claim 13, wherein, in instructions (e), the five lowest frequency AC coefficients are predicted for each pixel block.

16. The machine-readable medium of claim 13, wherein the classifying of each block in instructions (d) comprises comparing the estimated activity of that block to a preset threshold.

17. The machine-readable medium of claim 16, wherein, in instructions (d), a particular block is classified as a block of the first type if the estimated activity of that block is less than the threshold, and, if not, the particular block is classified as a block of the second type.

18. The machine-readable medium of claim 14, wherein instructions (g) comprise applying a strong low-pass filter to boundary region pixels in select first-type blocks and applying a weak low-pass filter to pixels in select second-type blocks.

19. The machine-readable medium of claim 18, wherein, for each block of the first type, the strong low-pass filter is applied to smooth boundary region pixels in both the horizontal and vertical directions if all of the predicted AC coefficients in the corresponding partial transform-coefficient block have absolute values less than a predetermined value;

smooth boundary region pixels in the vertical direction if at least one AC coefficient in a first select location in the corresponding partial transform-coefficient block has an absolute value greater than or equal to the predetermined value; and smooth boundary region pixels in the horizontal direction if at least one AC coefficient in a second location in the corresponding partial transform-coefficient block has an absolute value greater than or equal to the predetermined value.

20. The machine-readable medium of claim 19, wherein, for each block of the first type, the strong low-pass filter is applied to a current boundary region pixel only when a difference between a maximum pixel value and a minimum pixel value among a predetermined number of pixels centered on the current boundary region pixel is less than a predetermined parameter.

21. The machine-readable medium of claim 18, wherein, for each block of the second type, the weak low-pass filter is applied to smooth pixels inside the block in the horizontal direction if a difference between values of a first two adjacent pixels and a difference between values of a second two adjacent pixels are both less than a predetermined parameter and is applied to smooth pixels inside the block in the vertical direction if a difference between values of a third two adjacent pixels and a difference between values of a fourth two adjacent pixels are both less than the predetermined parameter.

* * * * *